United States Patent Office 3,851,049
Patented Nov. 26, 1974

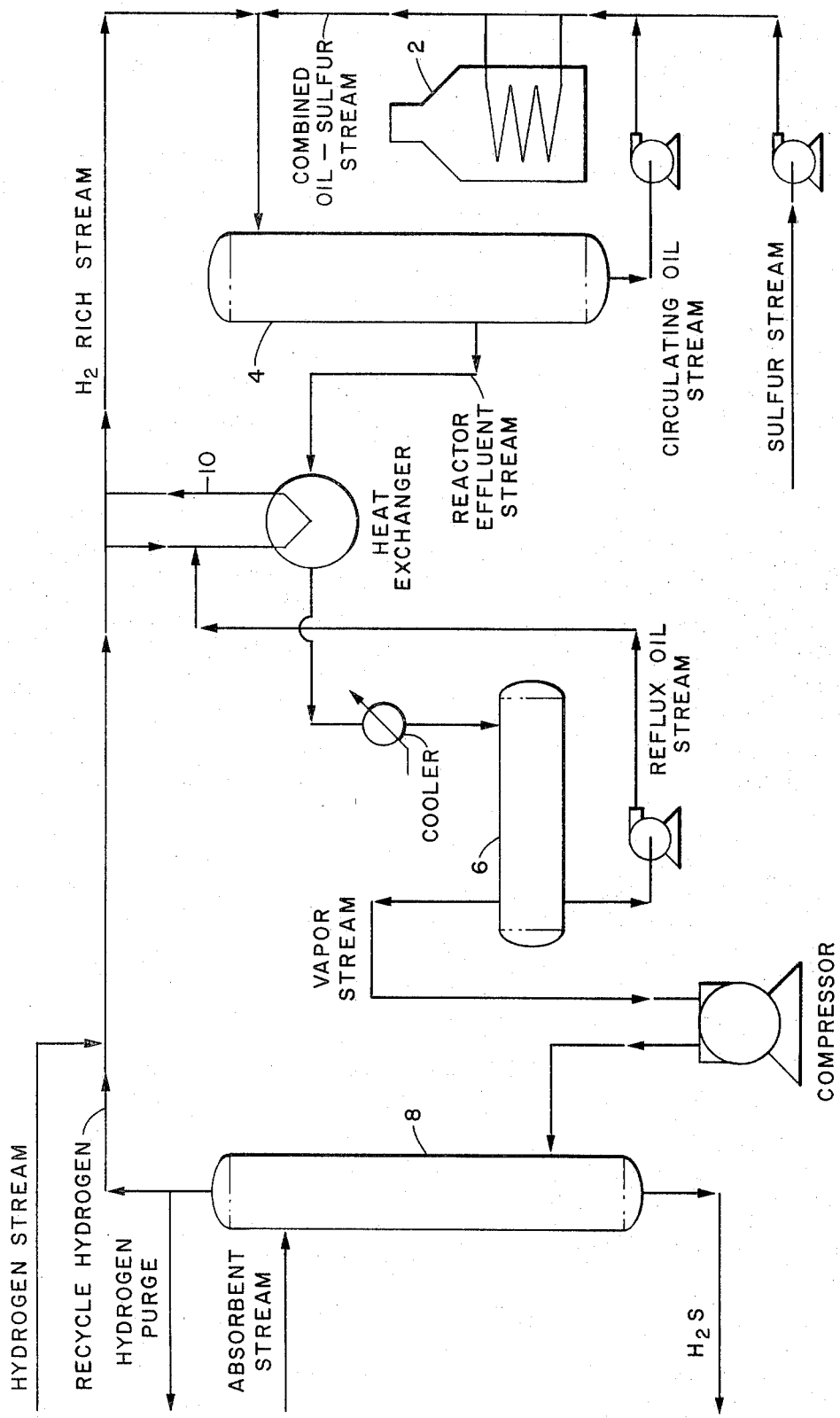

3,851,049
METHOD FOR PREPARING HYDROGEN SULFIDE
John H. Smith, Ponca City, Okla., assignor to Continental Oil Company, Ponca City, Okla.
Filed June 14, 1972, Ser. No. 262,908
Int. Cl. B01j 9/00; C01b 17/16
U.S. Cl. 423—564
2 Claims

ABSTRACT OF THE DISCLOSURE

Hydrogen sulfide is prepared by hydrogenating in the presence of a catalyst elemental sulfur which has been dissolved in a hydrocarbon oil of low volatility.

---

This invention relates to a method for producing hydrogen sulfide and in particular it relates to a method for producing hydrogen sulfide by hydrogenating, in the presence of a catalyst, elemental sulfur which has been dissolved in a hydrocarbon oil of low volatility.

Hydrogen sulfide has many known uses in the chemical industry. Hydrogen sulfide is used in the dye, rayon and leather industry as well as for many other purposes. Although some of the requirements of industry are met by by-product hydrogen sulfide, others that require hydrogen sulfide are physically remote from by-product sources. As a by-product of the petroleum industry hydrogen sulfide contains a great deal of ammonia and other impurities which are difficult to remove. Hydrogen sulfide can also be made by treating metal sulfides with steam or acids. However, this product contains gaseous as well as solid impurities which when using hydrogen sulfide as an intermediate chemical contaminates the end products so they cannot compete on a commercial scale with pure hydrogen sulfide.

Previously, hydrogen sulfide has been prepared by various methods which include bubbling hydrogen through molten sulfur at 250–300° C. under a pressure of 5 to 10 atmospheres to form hydrogen sulfide; through the use of a catalytic material of the oxide or sulfide of cobalt, nickel or molybdenum deposited on a carrier, vaporizing the sulfur extraneous to the catalyst, using an excess of sulfur over hydrogen and operating in temperatures between 500–800° C., it has previously been found that a high yield of hydrogen sulfide and a high rate of production may be obtained. Hydrogen has been reacted with gaseous sulfur in the presence of a bauxite catalyst to yield hydrogen sulfide. However, all of these previous processes fail to achieve desirable results in one or more ways due to high operating costs, slow reaction rates, toxicity of free action mixtures, dangerous explosive tendencies when exposed to air and high maintenance costs which make all of them economically not commercially feasible.

Therefore, it is an object of the present invention to provide an improved process for the manufacture of hydrogen sulfide.

Another object of the present invention is to provide an improved process for the production of hydrogen sulfide by hydrogenating elemental sulfur which has been dissolved in a hydrocarbon oil of low volatility in the presence of a hydrodesulfurization catalyst.

Another object is to provide an economical method for the production of hydrogen sulfide which does not suffer the disadvantages of the prior art systems.

Other objects, advantages and features of the present invention will become evident to those skilled in the art from a reading of the following detailed description.

According to the present invention, I have now discovered a process whereby hydrogen sulfide can be produced by contacting elemental sulfur with a hydrocarbon oil of low volatility, hydrogenating the sulfur in said oil in the presence of a hydrodesulfurization catalysts to form hydrogen sulfide, separating from the oil solution the hydrogen sulfide produced and stripping the hydrogen sulfide of excess hydrogen and recovering the final product of hydrogen sulfide. The raw materials for the present invention are elemental sulfur and a gas rich in elemental hydrogen and free of any significant concentrations of oxidants or other substances deleterious to the catalyst used or the sorbent or reactant stream used to extract the hydrogen sulfide from the recycle hydrogen employed.

In the operation of the present invention the elemental sulfur should be completely dissolved in a low volatile hydrocarbon oil prior to hydrogenation. As a hydrogenation catalyst useful in the present invention one can employ a catalyst consisting of the sulfides of one or more metals from Group VIB and/or Group VIII of the periodic table deposited upon a support of alumina of high surface area and low acidity. It has been found that the conventional cobalt molydenum hydrodesulfurization catalysts are very effective in the present invention. Further it has been found that although the hydrogenation reaction will occur at atmospheric pressure, preferably the pressure should be about 100 p.s.i.g. or higher depending upon the pressure of the available hydrogen-rich feed gas and the reactant or sorbent used to strip the hyrogen sulfide from the recycle hydrogen-rich gas.

The hydrogenation of sulfur to hydrogen sulfide can be effected at temperatures of from about 300° F. to 800° F., preferably the temperatures should be from about 500 to 650° F. It has been found that at temperatures lower than the above the reaction is needlessly slow and requires an excessive volume of catalysts and at higher temperatures the rates of vaporization or decomposition of the sulfur conveying oil become excessive.

In the operation of the present invention the sulfur should be fed at a rate relative to the desired rate of production of hydrogen sulfide, the yield being approximately one pound mol of hydrogen sulfide per pound atom of sulfur converted. Also, the ratio of the oil circulation to sulfur feed should be in a reasonable excess of the minimum required to effect complete solution of the sulfur which is only partially soluble in the hydrocarbon oil. By increasing the oil/sulfur ratio one also reduces the temperature rise through the catalyst which results from the exothermic reaction. It is desired to have a low temperature rise so that the mean reaction temperature closely approaches the maximum to insure a high rate of reaction through the bed to minimize the required catalyst volume. It is suggested that a ratio of 25 pounds of circulating oil per pound of sulfur feed is preferred.

Reference to the accompanying drawing will serve to further illustrate the process of my invention. Thus, in the drawing a flow diagram is shown illustrating a preferred embodiment as a downflow fixed bed reactor with a conveying oil surge and separating section beneath the catalyst bed. The hydrogen streams combines with the recycle hydrogen and reflux oil stream to form a combined hydrogen-rich stream. As shown by numeral 10 the hydrogen-rich stream exchanges heat with the reactor effluent stream wherein the amount of heat recovered in the hydrogen-rich stream is controlled to maintain the desired reactor outlet temperature. The sulfur stream joins the circulating oil stream to form a combined oil-sulfur stream which in turn is commingled with the combined hydrogen-rich stream at the inlet to the reactor 4. The oil is circulated continuously from the surge section to the top of the reactor 4 where it is uniformly distributed across the top of the catalyst from which it trickles down through the catalyst back to the surge section. The sulfur stream is charged into the circulating oil line so that it become completely dissolved in the oil before the oil is dischraged onto the top of the catalyst bed in reactor 4. The reactor effluent stream which is rich in hydrogen sulfide after first exchanging heat with the hydrogen-rich stream is further cooled to near ambient temperature to condense contained oil vapors and the resulting vapor-liquid mixture enters the cold separator 6 from whence the reflux oil stream is returned to the reactor through the hydrogen-rich stream. The vapor stream coming from the cold separator 6 consists of recycle hydrogen-rich gas and product hydrogen sulfide. It is compressed and flows through the hydrogen sulfide absorber 8 wherein the hydrogen sulfide is removed from the recycle hydrogen-rich gas. A portion of the recycle hydrogen-rich gas is purged from the system to prevent excessive buildup of inert contaminants contained in the make-up hydrogen and light hydrocarbon gases formed from hydrocracking of the circulating oil in the hydrogenation reactor.

The absorbent stream enters the top of the hydrogen sulfide absorber 8 and flows countercurrently to the recycle hydrogen-rich gas extracting the hydrogen sulfide therefrom and leaves from the bottom of the absorber 8. The absorbent may be a material which chemically reacts with hydrogen sulfide to form a desired product or it may be just a vehicle such as an alkanol amine which is used to concentrate the hydrogen sulfide to high purity. In the preferred embodiment, the absorbent-$H_2S$ stream leaving at the bottom of absorber 8 could be regenerated by stripping the $H_2S$ therefrom in facilities not shown in the flow diagram but well known to the chemical industry.

Suitable hydrocarbon oils of low volatility for use in the present invention include any well refined distillate, preferably boiling in the range of 500° F. to 800° F. and with a vapor pressure of 5 to 20 percent of reactor operating pressure at the normal temperature leaving the catalyst bed.

Suitable absorbents for use in the present invention include any of the alkanol amines with a preference for the simpler members of this group, particularly monoethanol amine.

Having thus described my invention, I claim:

1. Method for preparing hydrogen sulfide which comprises the steps of:
   (a) contacting elemental sulfur with a hydrocarbon oil of low volatility;
   (b) hydrogenating at a temperature of from about 300° F. to about 800° F. and at a pressure of about 100 p.s.i.g. the sulfur in said oil in the presence of a hydrodesulfurization catalyst selected from the group consisting of sulfides of one or more metals from Groups VIB and Group VIII of the periodic table on an alumina support to form $H_2S$;
   (c) separating the $H_2S$ produced in step (b) from the oily solution, and
   (d) stripping said $H_2S$ of excess hydrogen and recovering the final product of hydrogen sulfide.

2. The method of Claim 1 wherein said catalyst is a cobalt-molybdenum hydrodesulfurization catalyst.

References Cited

UNITED STATES PATENTS

| | | | |
|---|---|---|---|
| 1,992,895 | 2/1935 | Bley | 423—564 |
| 2,325,033 | 7/1943 | Byrns | 252—465 |

OSCAR R. VERTIZ, Primary Examiner

H. S. MILLER, Assistant Examiner

U.S. Cl. X.R.

252—465, 466